(12) United States Patent
Boost (10) Patent No.: US 6,617,708 B2
(45) Date of Patent: Sep. 9, 2003

(54) MODULAR POWER DISTRIBUTION SYSTEM

(75) Inventor: Mike Boost, Tuscon, AZ (US)

(73) Assignee: C&D Charter Holdings, Inc., Wilmington, DE (US)

( * ) Notice: Subject to any disclaimer, the term of this patent is extended or adjusted under 35 U.S.C. 154(b) by 0 days.

(21) Appl. No.: 09/955,362

(22) Filed: Sep. 18, 2001

(65) Prior Publication Data

US 2003/0052543 A1 Mar. 20, 2003

(51) Int. Cl.⁷ .................................................. H02J 7/00
(52) U.S. Cl. ............................ 307/42; 307/66; 361/601
(58) Field of Search ...................... 363/69, 52; 361/614, 361/626, 605, 615, 622, 628, 601; 307/42, 66

(56) References Cited

U.S. PATENT DOCUMENTS 5,712,779 A    1/1998   Sheppard et al.
6,315,580 B1 * 11/2001  Hurtubise et al. ............ 439/82

* cited by examiner

Primary Examiner—Shawn Riley
(74) Attorney, Agent, or Firm—Hoffmann & Baron, LLP (57) ABSTRACT

A 6,000 to 10,800 ampere rated modular power system for converting alternating current to direct current is provided. The modular power system includes a modular power bay having a plurality of rectifiers for converting alternating current to direct current and a modular power distribution assembly having a plurality of fuses for distributing the direct current. The modular power bay and the modular power distribution assembly include front access doors for ease of maintenance. The modular power system is also low profile for ease of maintenance. The modular design allows for expansion in the converting and delivery portions of the system.

24 Claims, 6 Drawing Sheets

MODULAR POWER DISTRIBUTION SYSTEM

FIELD OF THE INVENTION

The present invention relates to a direct current (DC) electrical power supply system. More specifically, the present invention relates to a modular power distribution system having a low profile and enhanced accessibility for maintenance and expansion.

BACKGROUND OF THE INVENTION

Numerous operations, such as operation of telecommunication systems, require low voltage direct current (DC) electrical power supply systems for operating DC-powered equipment at remote sites or in central office installations. Such equipment often operate at low voltage, such as plus 24 volt to minus 48 volt DC power. Many of such operations, however, do not have DC power directly available and must convert conventional single-phase alternating current (AC) electrical power to DC power.

Traditional central office power supply systems typically require a height in excess of seven feet to accommodate the DC power supply system and related bus work and cabling. The traditional central office power supply systems typically have large overhead cables and buses above the DC power supply system to provide electrical connections among the various components of the system. Such overhead cabling and buses often result in excessive height requirements which limit expansion of the power supply system, makes installation and maintenance of the bus work complicated and costly. The height requirements for the overhead cabling and buses also often limit the location of the power system to those locations that can accommodate the height requirements.

Traditional power systems are also somewhat limited in expansion capability. Traditional systems are often expandable in one direction, for instance left or right. The direction of desired expansion, however, may be constrained by the location particulars. The locations containing traditional power systems are also usually not particularly spacious. In this regard it is also desirable to be able to install, service and modify such power supply systems in such a way that system installation, servicing and replacement of components may be carried out in an efficient manner. Such traditional systems often only have rear access for maintenance resulting in large space requirements for access at the rear of the systems while still requiring access in the from of the systems for routine operation and monitoring. Furthermore, maintenance or expansion typically requires the moving of a system assembly or cabinet in more space-limited enclosures lacking adequate maintenance access.

Thus, there is a need for a DC power supply system having improved capability for expansion and enhanced accessibility for maintenance and expansion. In particular, there is a need for a DC power system having access from the front portion of the system without having to move the system assembly or cabinet within the enclosure.

SUMMARY OF THE INVENTION

The present invention provides an improved DC electrical power supply system, particularly adapted for use in conjunction with equipment requiring reliable supply of low voltage DC power. The DC electrical power system of the present invention provides full access from the front portion of the system without having to move the system assembly. Shunts are positioned within the system so as not to limit the capability for expansion. Moreover, the bus design is integrated within the system while still not exceeding seven feet in overall height.

In one aspect of the present invention a modular power system for converting alternating current to direct current up to about 15,000 amperes or less is provided. The modular power system includes, in part, a modular power bay for converting alternating current to direct current and a modular power distribution assembly for distributing the direct current. The modular power bay includes a plurality of rectifiers for converting the alternating current to direct current, a power bay charge bus in electrical communication with the rectifiers for receiving the direct current therefrom and a frame for containing the rectifiers and the power bay charge bus. The modular power distribution assembly includes, in part, a plurality of electrical fuses or circuit breakers for routing direct current therethrough, a power distribution discharge bus in electrical communication with the fuses or circuit breakers and a frame for containing the fuses or circuit breakers and the power distribution charge bus.

The power bays of adjacent power bays and power distribution assemblies interconnect to provide electrical connection therethrough. The power bays are also contained within frames. The frames for the power bays and for the power distribution assemblies are typically no more than seven feet in height, which is a substantial reduction in height requirements for systems with similar power ratings.

The power system of the present invention may include a plurality of power bays with each power bay containing up to eight rectifiers with each rectifier being rated for up to 450 amperes of direct current. The power bays are electrically connected in series and adjacent power bays are interconnected at their charge and ground return buses.

The power system of the present invention further includes a shunt within the frame of the power distribution assembly for monitoring the amount of direct current entering the power distribution assembly. The shunt is electrically connected between the power distribution charge bus and the power distribution discharge bus which in turn is electrically connected the fuses or circuit breakers. The shunt is located within the power distribution assembly. The power system may contain a plurality of power distribution assemblies with each assembly having a shunt so that capacity of the system is not limited by a master shunt as additional assemblies are added to the system for expansion thereof.

In another aspect of the present invention a central DC office power system is provided for delivering direct current being up to about 15,000 amperes or less. The central DC office power system includes, in part, a modular power bay comprising a plurality of rectifiers for converting the alternating current to the direct current, a modular power distribution assembly comprising a plurality of electrical fuses or circuit breakers for routing direct current therethrough, a battery reserve for delivering supplemental DC current and a distribution fuse bay for delivering a plurality of DC currents to DC power-consuming equipment.

In yet another aspect of the preset invention, a power distribution assembly capable of receiving and delivering up to about 15,000 amperes or less of direct current is provided. The assembly includes, in part, a generally rectangular frame, a plurality of fuses or circuit breaker contained within the frame, a plurality of cables having fuse or circuit breaker-connecting ends connected to the fuse outlets, and a tray for supporting portions of the electrical cables at the fuse or circuit breaker-connecting ends. The fuse or circuit breaker outlets and the cable trays terminate near the front portion of the frame and are also angled towards the front portion of the frame to permit accessibility thereat. The frame has an opening or openings for access to the fuse or circuit breaker outlets and cable connections. The openings may be covered by a movable door and provide access to the fuse or circuit breakers, the fuse or circuit breaker outlets and the fuse or circuit breaker-connecting cable ends.

DETAILED DESCRIPTION OF THE INVENTION

In the following description like elements are marked throughout the specification and drawings with the same reference numerals. The drawing figures may not be to scale and certain elements may be shown in generalized or somewhat schematic form in the interest of clarity and conciseness.

Figure 1:
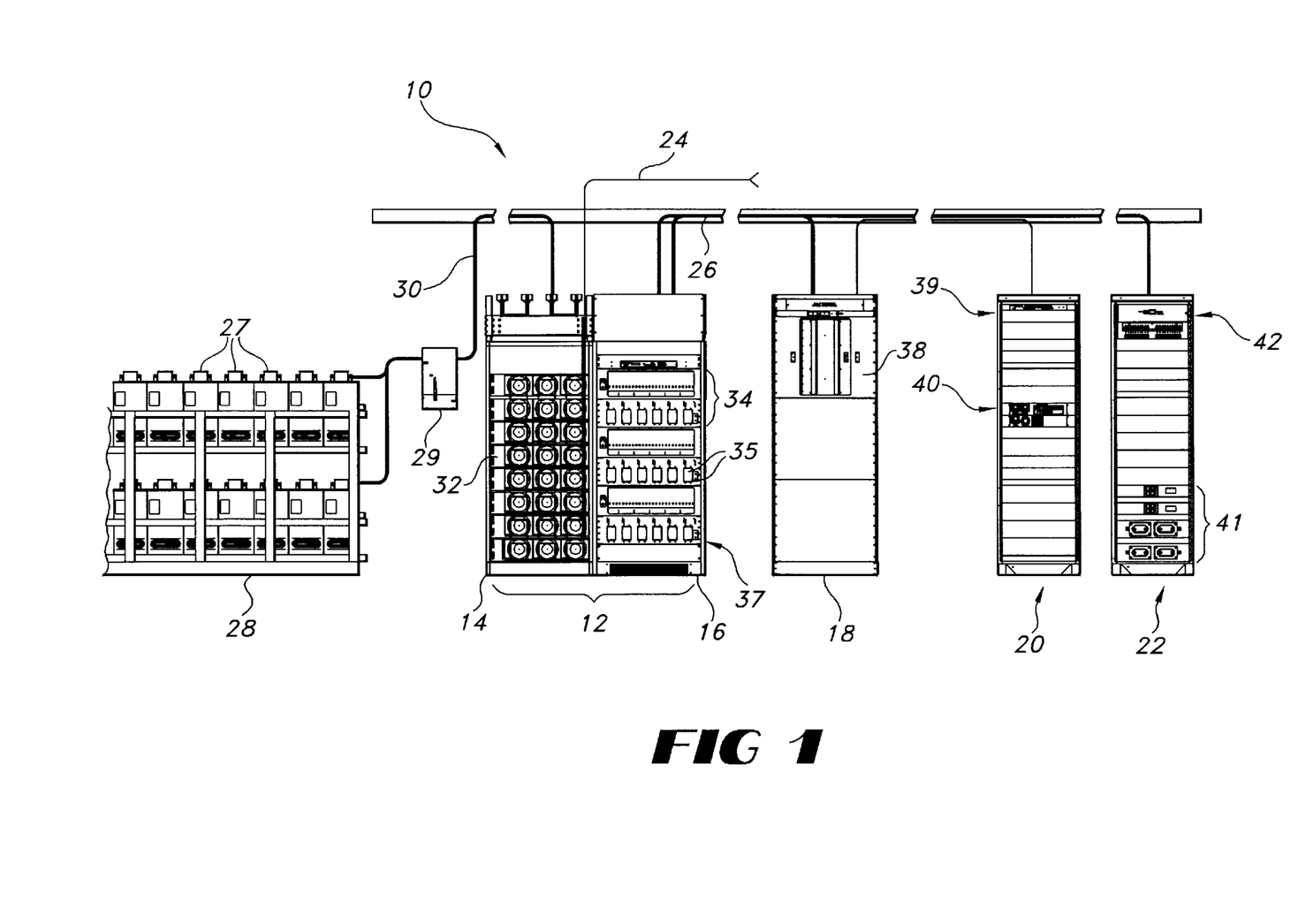
FIG. 1 is an illustration of a central DC office power system of the present invention.

A central DC office power system 10 according to the present invention is depicted in FIG. 1. The central DC office power system 10 includes power system 12, a battery reserve 28, a battery distribution fuse bay 18, an equipment distribution assembly 20 and a co-location distribution assembly 22, interrelated as shown. A source of AC power is provided to the power system 12 via a cable 24. The power system 12 converts the AC power into DC power and delivers this DC power for subsequent use via electrical passageway 26. The AC power can be any suitable power, such as, but not limited to, conventional single phase or multi-phase alternating current. Such alternating current is typically available from about 120 to about 600 volts AC. Desirably, the alternating current is available at 430 to 520 volts AC, three phase, and 47 to 63 hertz.

In the event that the source of AC power (not shown) becomes unreliable, then DC power from battery reserve 28 enters the power system 12 via electrical passageway 30 for routing reserve DC power to electrical passageway 26. Battery reserve 28 contains a plurality of batteries 27. The number and type of batteries used depend upon, among things, the total load and hours of reserve capacity desired. Suitable batteries include valve regulated lead acid (VRLA) batteries, such as Liberty VRLA HD1300 and MCT4000, available from C&D Technologies, Inc. of Blue Bell, Pa.

Battery disconnect 29 is provided to permit the isolation of the battery reserve 28 from the power system 12. Such isolation is useful for maintenance purposes.

The DC power from power system 12 enters the battery distribution fuse bay 18 which consists of, among other things, distribution 38 having a plurality of breakers or fuses (not shown). The power system 12 also contains a GMT fuse panel 39 for delivery of DC power to DC power-consuming equipment 40 contained in equipment distribution assembly 20. DC power from the power system 12 may also be routed to co-location distribution assembly 22 which typically contains additional DC power-consuming equipment 41. The co-location distribution assembly 22 also contains breakers or fuses (not shown) in co-location panel 42 to guard against undesirable current flows.

The power system 12 includes a power bay 14 and a power distribution assembly 16 in electrical communication with one and the other. Power system 12, including the power bay 14 and the power distribution assembly 16, is a low profile, i.e., seven feet or less in overall height, modular system. Power bay 14 includes a plurality of rectifiers 32 for converting AC power into DC power. The rectifiers 32 have a power rating of about 400 amperes at −60 volts DC. Such rectifiers are commercially available. The power bay 14 can contain up to eight rectifiers 32, thereby providing the power bay 14 with a power rating of 3,200 amperes at −60 volts DC. The power system 12 may contain a plurality of power bays 14 depending upon the overall power requirements of the central DC office power system 10. For example, with three power bays 14 having a total of about twenty-four rectifiers 32, the power system 12 has a rating of about 9,600 amperes. The present invention, however, is not limited to such an arrangement of rectifiers and other arrangement of rectifiers and rectifiers with other ratings may suitable be used. The selection of the type of rectifier and the number of rectifiers used depend, in part, upon the source of the AC power and the demands of the DC power.

Power distribution assembly 16 includes a plurality of TPL fuse distribution assemblies 34 to provide protection against undesirable amperes or flow of DC current. The TPL fuses 35 are provided in a series of TPL fuse panels 37, for instance three TPL fuse bays, with each TPL fuse panel 37 containing up to six TPL fuses 35. The TPL fuses 35 have a rating from about 200 amperes to about 600 amperes. Such TPL fuses are commercially available. For instance, TPL fuses with 200 to 600 ampere ratings are commercially available from C&D Technologies, Inc. With a total of about eighteen TPL fuses 35, the primary distribution assembly 16 has a rating of about 3,600 amperes to about 10,800 amperes. Desirably, the primary distribution assembly 16 has a rating of about 6,000 amperes. These power ratings, however, are non-limiting. Moreover, the present invention is not limited to such an arrangement of TPL fuses and other arrangement of TPL fuses and TPL fuses with other ratings may suitable be used. Furthermore, circuit breakers may be suitably used in place of all or some of the TPL fuses.

Figure 2:
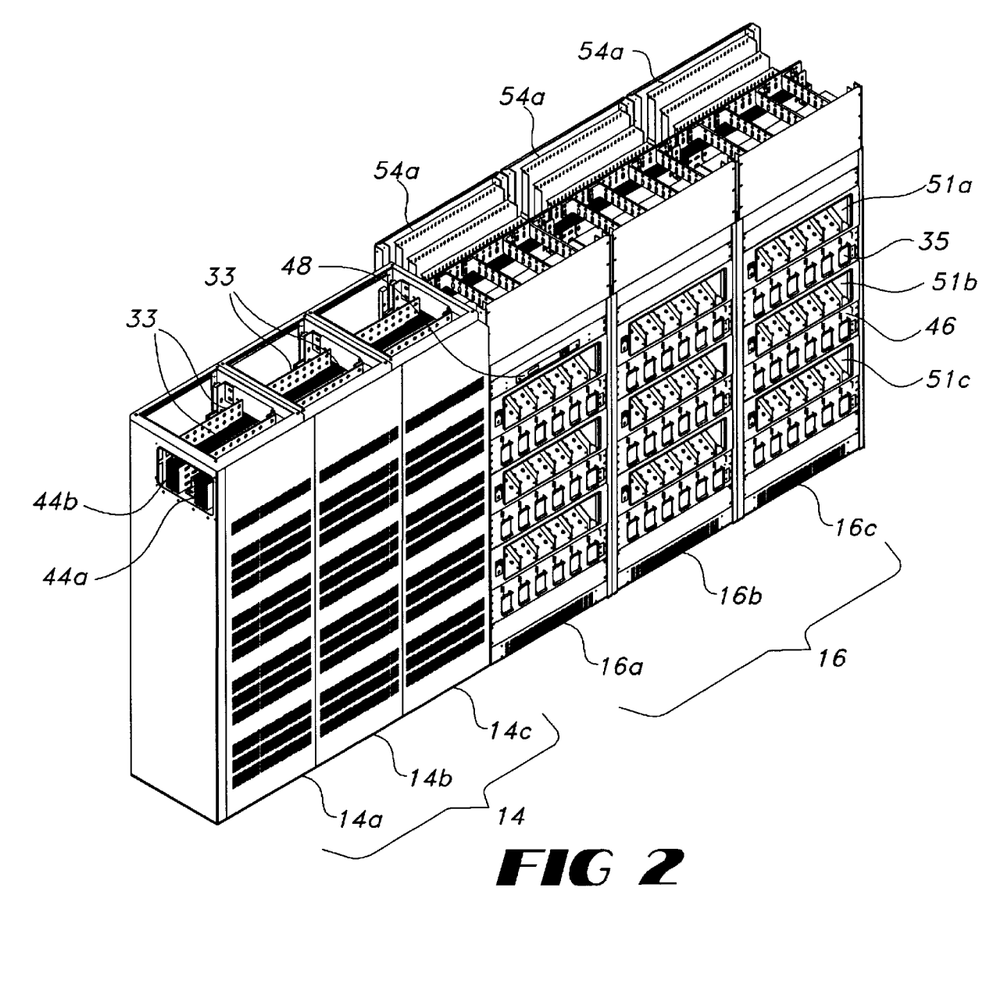
FIG. 2 is a perspective view of a portion of the central DC office power system of FIG. 1.

The power system 12 of the present invention is shown in further detail in FIG. 2. As shown in FIG. 2, the power system 12 can contain a plurality of power bays, for instance power bays 14a, 14b and 14c. The number of power bays 14 depends, in part, upon the overall requirement for DC power. Any number of power bays 14 may be used with the present invention. Desirably, the number of power bays 14 is nine or less. More desirably, the number of power bays 14 is three or less. These power ratings, however, are non-limiting. Furthermore, the power system 12 is desirably configured to have an overall power rating from about 2,400 to about 15,000 amperes. An overall power rating of at least 3,000 amperes or more is also useful. Desirably, the overall power rating is at least 6,000 amperes or more.

Each power bay 14 is configured to have a rating from about 400 to about 3,200 amperes depending upon the number of rectifiers 32 contained therein. These ampere ratings are not limiting and other ampere ratings and capacities may suitably be used with the present invention. For example, rectifiers and power bays may be selected such that the total direct capacity of the system is from about 3,000 amperes to about 15,000 amperes.

Each power bay 14 also includes a modular charge bus 44a and a modular ground return bus 44b. Desirably, the modular charge bus 44a and the modular ground return bus 44b from one power bay 14a interconnect respectively with adjacent modular charge bus 44a and ground return bus 44b of an adjacent power bay 14b. This reduces or eliminates the need for overhead cables or other distribution assemblies for connecting one power bay 14a to another power bay 14b. The buses desirably have, but are not limited to, a rating of 10,800 amperes or more. Furthermore, the power bays 14a, 14b and 14c have battery string connections 33 for receiving DC power from the battery reserve 28.

The power distribution assembly 16 may also contain a plurality of individual power distribution assemblies. As shown in FIG. 2, the power distribution assembly 16 contains a primary power distribution assembly 16a, which may optionally contain a controller 48 for controlling the system. The selection of a particular type of controller depends upon, among other things, the number electrical connections to be monitored and controlled. Such connections provide DC power to equipment as described above. Suitable controllers include a Series 100 controller which is available from C&D Technologies. The secondary power distribution assemblies 16b and 16c are used to provide power to additional customer equipment.

As shown in FIG. 2, each power distribution assembly 16a, 16b or 16c can support up to 18 TPL fuses 35. When the primary power distribution assembly 16a contains the controller 48 additional secondary power distribution assemblies 16b or 16c may be used. As shown in FIG. 2, the power distribution assembly 16a, 16b and 16c can support up to 54 TPL fuses 35. The TPL fuses 35 are supported in TPL distribution panels 34 with each panel 34 supporting 6 TPL fuses 35. Such an arrangement is, of course, non-limiting and other arrangement of fuses or circuit breakers and fuse or circuit breaker panels may suitably be used.

Figure 4:
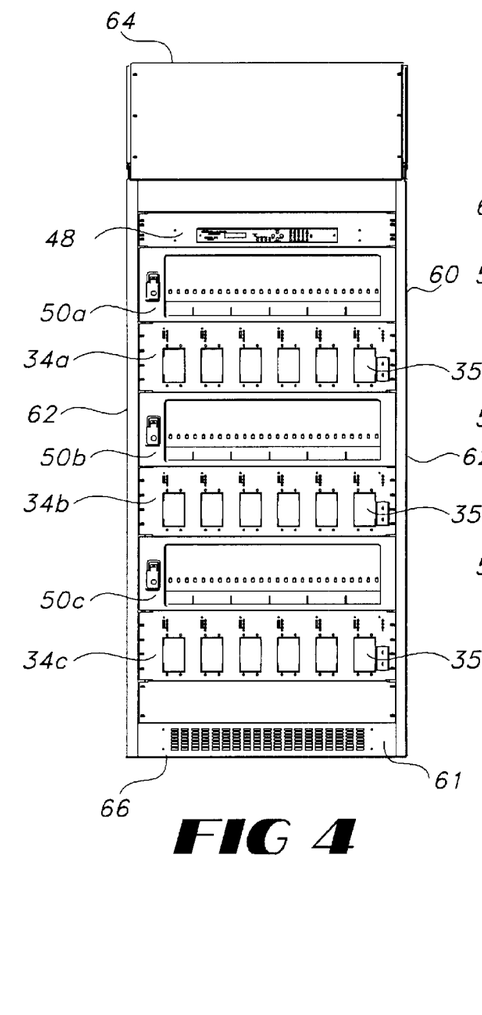
FIG. 4 is a front view of the primary distribution assembly of FIG. 3 taken along the 4—4 axis.

Moreover, each power distribution assembly 16a, 16b and 16c have front access openings, such as openings 51a, 51b or 51c, directly above the TPL distribution panels 34 as shown in FIG. 2. As shown in FIG. 4, doors 50a, 50b and 50c cover these openings 51a, 51b and 51c. The doors 51a, 51b or 51c may be of any suitable configuration. Desirably, each door provides access to individual TPL distribution panels 34. Alternatively, one door may be provided for accessing all of the individual TPL distribution panels on a power distribution assembly.

The power distribution assemblies 16a, 16b and 16c also contain a modular charge bus 52a and a modular ground return bus 52b. These buses permit the electrical connection of one power distribution assembly to an adjacent power distribution assembly. Furthermore, the modular charge bus 52a and the modular ground return bus 52b of primary power distribution assembly 16a can connect with the modular charge bus 44a and ground return bus 44b of an adjacent power bay, such as power bay 14c. Which such modular charge and ground return buses for providing electrical connection between adjacent equipment, the power system 12 can be expanded in either direction by providing additional power bays and/or power distribution assemblies without the need for extensive overhead cabling or overhead busing, as required by prior art power systems.

Figure 3:
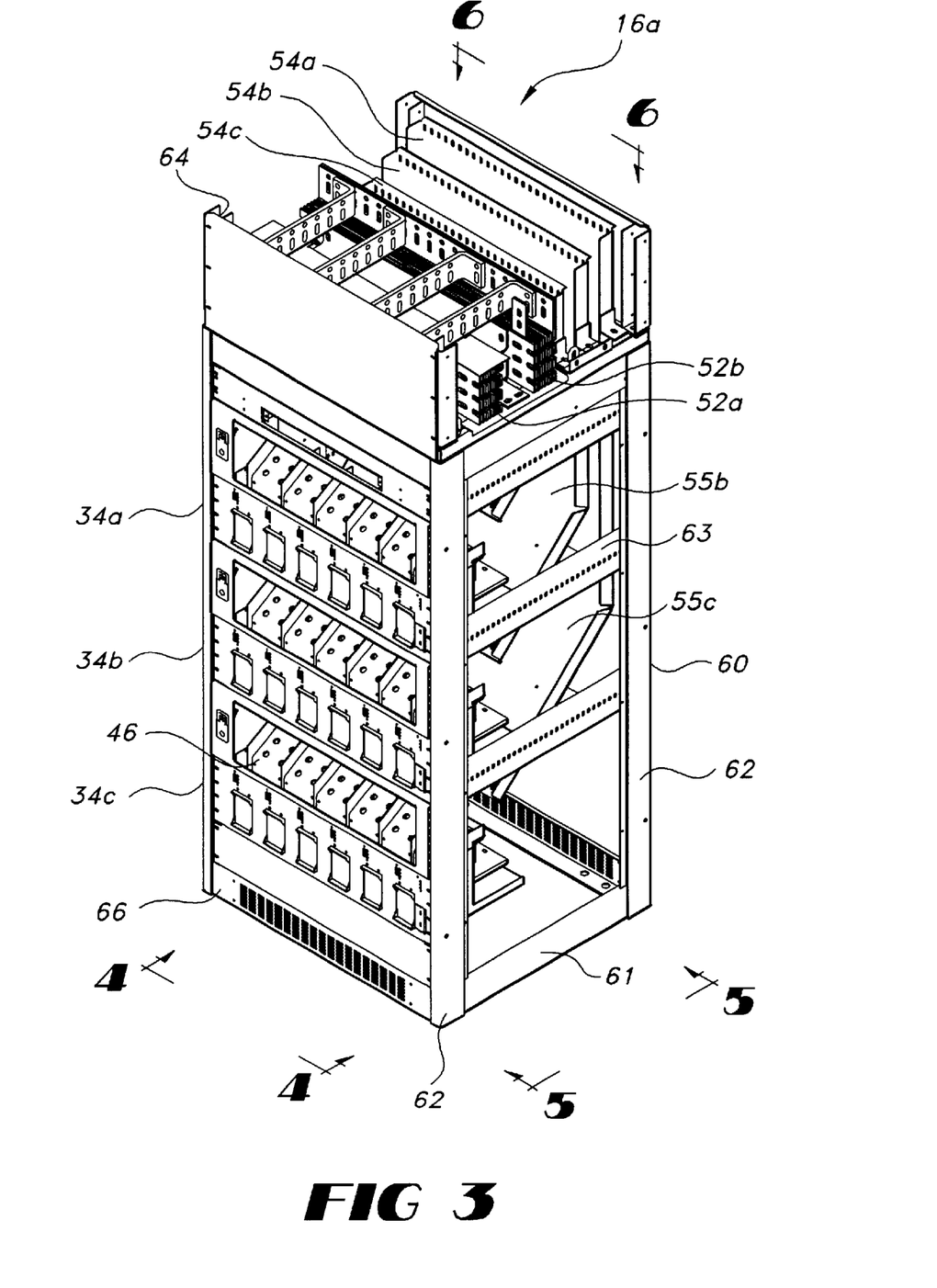
FIG. 3 is a perspective view of a primary distribution assembly of the present invention.
Figure 5:
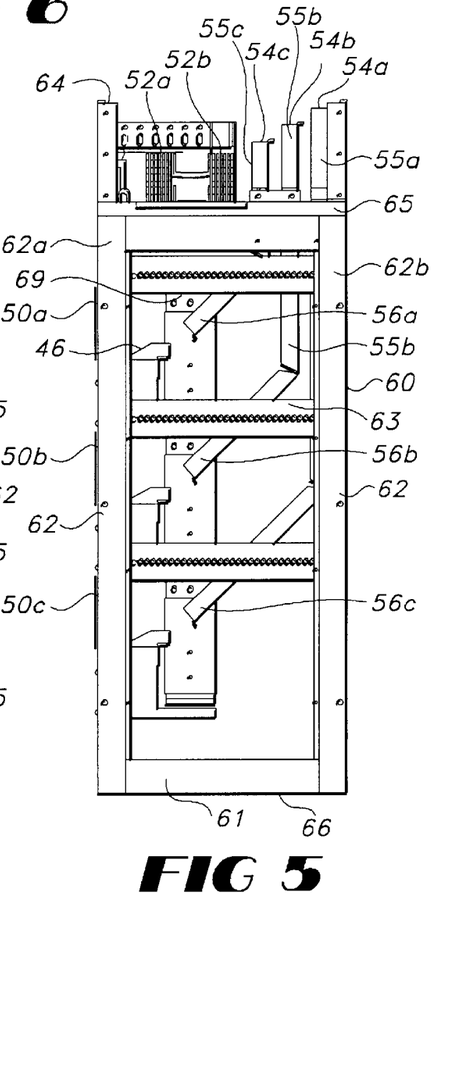
FIG. 5 is a side view of the primary distribution assembly of FIG. 3 taken along the 5—5 axis.
Figure 6:
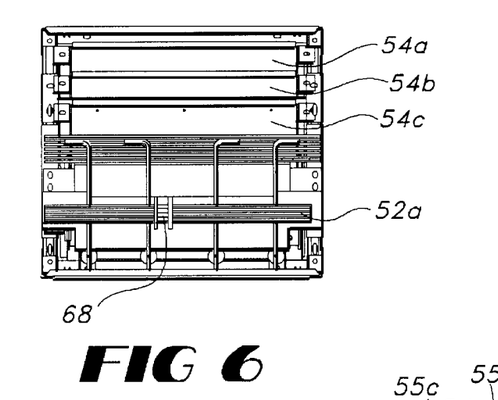
FIG. 6 is a top view of the primary distribution assembly of FIG. 3 taken along the 6—6 axis.

Further details of the power distribution assembly 16 are described below in conjunction with FIGS. 3 through 6. FIG. 3 is an alternate perspective view of a power distribution assembly 16. FIGS. 4, 5 and 6 are front, top and side views of the assembly of FIG. 3, respectively. The power distribution assembly includes a frame 60 having a generally rectangular base 61 and four frame posts 62 extending substantially vertically upward from the base 61. Connecting members 63 connect different portions of frame posts 62 to provide a mechanically secure frame 60 suitable for holding the different components thereat. Desirably, the top surface 64 of frame 60 is about seven feet or less from the opposed bottom surface 66 of base 61. Such a low profile allows for easier access and maintenance as compared to prior art central office DC power systems. Furthermore, the low profile of the power distribution assembly 16 is consistent with the low profile of the power bay 14 to provide a low profile power system 12.

Figure 7:
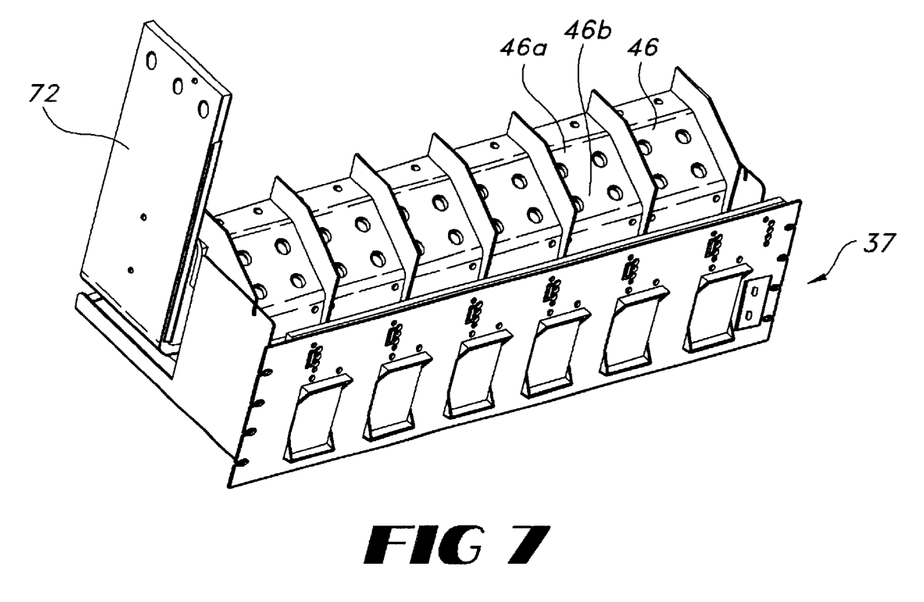
FIG. 7 is a front perspective view of a TPL fuse panel of the primary distribution assembly of FIG. 3.
Figure 8:
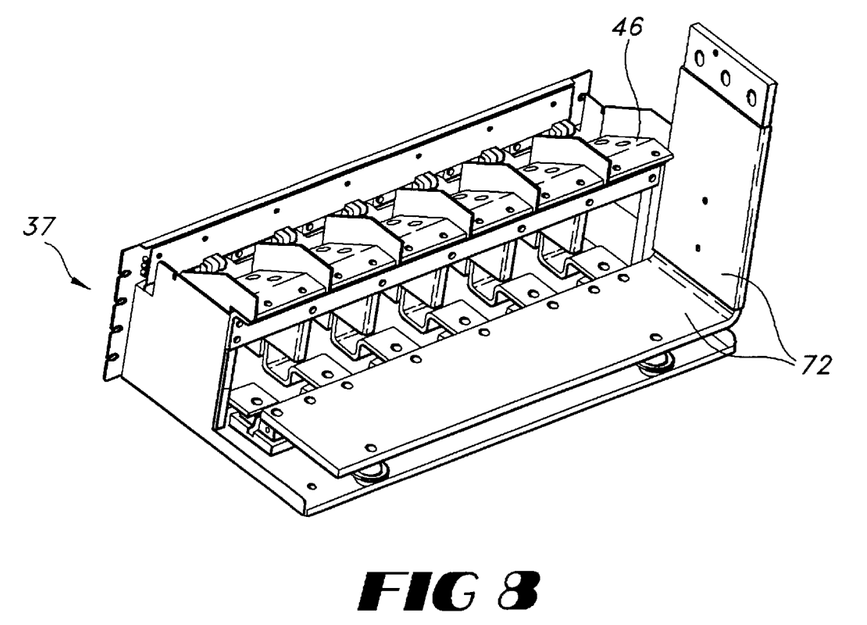
FIG. 8 is a back perspective view of a TPL fuse panel of the primary distribution assembly of FIG. 3.

The power distribution assembly 16 contains trays 54a, 54b and 54c that direct TPL fuse panel cabling (not shown) to individual TPL fuse outlets 46 on TPL distribution assemblies, 34a, 34b and 34c, respectively. As can be seen in FIG. 5, the trays 54a, 54b and 54c extend vertically downward from the top portion 65 of power distribution assembly 16 in parallel fashion to the frame post 62b to define tray portions 55a, 55b and 55c. The trays 54 then are obtusely angled at from about 120 degrees to about 150 degrees toward the TPL fuse outlets 46 to define angled tray portions 56a, 56b and 56c. Having angled tray portions 56a, 56b and 56c obtusely angled from tray portion 55a, 55b and 55c allows for, among other things, easy cable routing to a TPL fuse panel 37. Desirably, the trays 54 are obtusely angled at about 135 degrees. Moreover, the cable routing is contained within the power distribution assembly 16 to reduce overall spacing requirement. The angularly disposed trays also permit electrical connection of cables (not shown) to angled TPL fuse outputs 46 as shown in FIG. 7. The angled TPL fuse outlets 46 are at an acute angle from about 20 degrees to about 70 degrees from front post member 62a with a back portion 46a being higher that a front portion 46b of the angled TPL fuse outlets 46. Desirably, the angled TPL fuse outlets 46 are at an acute angle of 30 degrees to the front post member 62a. Such angling permits front access of the TPL fuse outputs 46 via the doors 50a, 50b and 50c.

Power distribution assembly 16 further includes a shunt 68 which monitors the total DC power output of the power distribution assembly 16. As depicted in FIG. 6, the shunt 68 provides electrical connection between the modular charge bus 52a and a discharge bar 69. The discharge bar 69 provides electrical connection to the TPL fuses via TPL charge bar 72. Desirably, the shunt 68 is rated for about 6,000 amperes. By having the shunt 68 on each power distribution assembly 16, expansion of the power system 12 is not limited by one master shunt, as is the case with typical power distribution systems. Controller 48 sums the total current of all of the power distribution assemblies 16 and further controls the distribution of the direct current.

Figure 9:
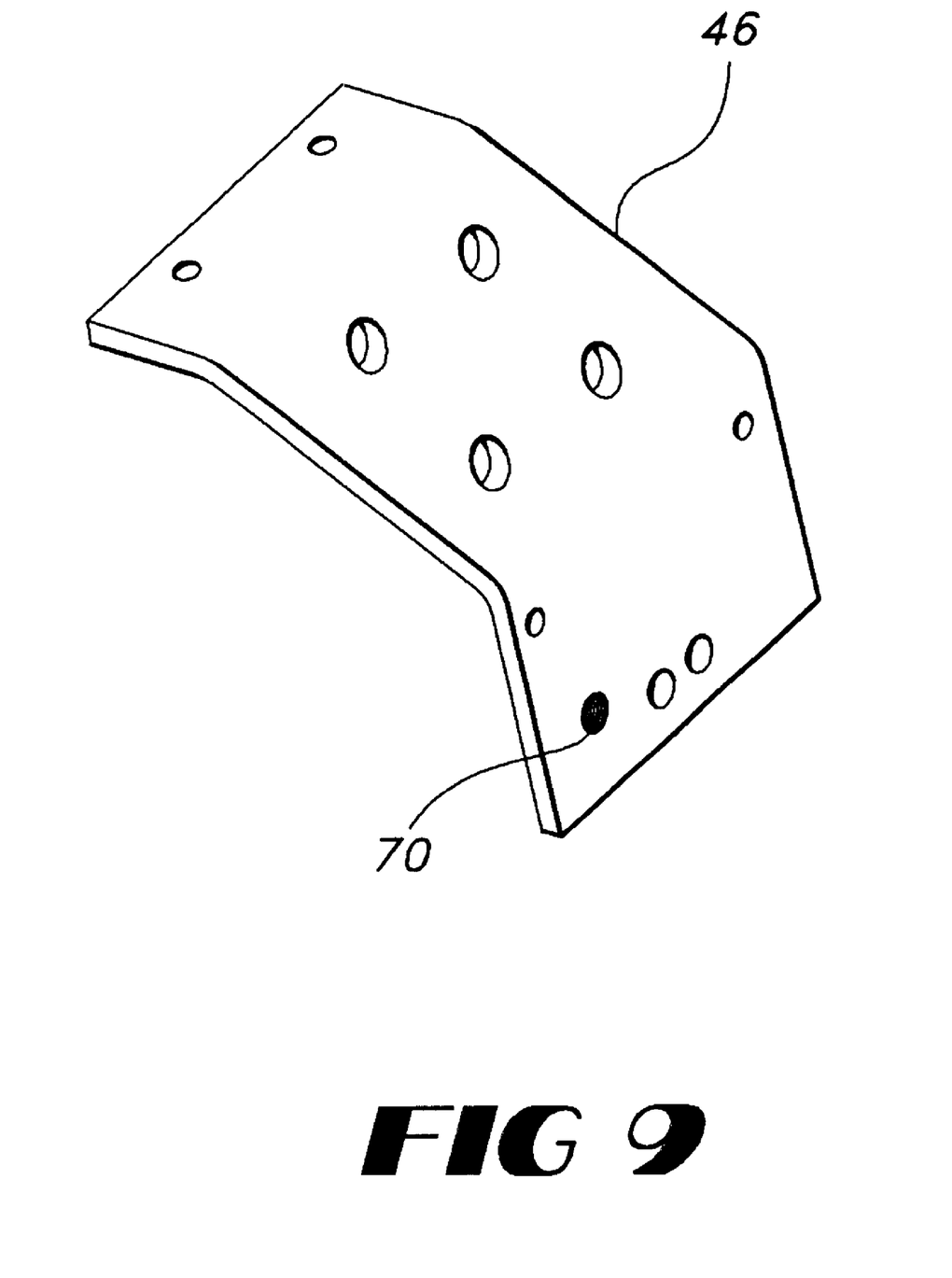
FIG. 9 is a perspective view of a TPL bus plate having a temperature probe.

FIG. 9 is a perspective view of a TPL fuse outlet 46. The TPL fuse outlet includes a temperature probe 70 for monitoring the temperature proximal to the location where the cable connecting-end (not shown) is securably attached to the TPL fuse outlet. The cable connecting-end may be securably attached by any convenient means, such as by a screw or a threaded bolt. The temperature probe 70 effectively measures the junction temperature. A loose connection would increase the junction temperature. Furthermore, a loose connection is often characterized by a discoloration of the proximal metal material. Such disclorations may be advantageously observed through the panel openings 51a, 51b and 51c.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A modular power system for converting alternating current to direct current comprising:
    i) a modular power bay comprising:
        a) a plurality of rectifiers for converting the alternating current to direct current, the direct current being at least about 15,000 amperes or less,
        b) a power bay charge bus in electrical communication with said rectifiers for receiving the direct current from the rectifiers, said power bay charge bus having opposed ends; and
        c) a frame for containing said rectifiers and said power bay charge bus;
    wherein said power bay charge bus is disposed within said frame; and
    ii) a modular power distribution assembly comprising:
        a) a plurality of electrical fuses or circuit breakers for routing direct current therethrough;
        b) a power distribution charge bus having opposed ends wherein one end of said power bay charge bus is in electrical communication with one end of said power distribution charge bus, said power distribution charge bus being in electrical communication with said fuses or said circuit breakers;
        c) a frame for containing said fuses or said circuit breakers and said power distribution charge bus; wherein said power distribution charge bus is disposed within said frame;
    wherein when said modular power distribution assembly and said power bay are adjacent to one and the other, the one end of said power bay charge bus being interconnected with the one end of said power distribution charge bus to provide electrical connection therethrough.

2. The power system of claim 1 further comprising:
    a power bay ground return bus having opposed ends disposed within said frame of said power bay; and
    a power distribution ground return bus having opposed ends, said power distribution charge bus being disposed with said frame of said power distribution assembly;
    wherein one end of said power bay ground return bus being interconnected with one end of said power distribution ground return bus to provide electrical connection therethrough when said modular power distribution assembly and said power bay are adjacent to one and the other.

3. The power system of claim 1, wherein each of said rectifiers being rated for up to about 450 amperes of direct current.

4. The power system of claim 1, wherein said power bay contains up to eight rectifiers.

5. The power system of claim 1, wherein the direct current is about 2,400 amperes or greater.

6. The power system of claim 1, wherein the direct current is about 6,000 amperes or greater.

7. The power system of claim 1, wherein the direct current is at least about 10,800 amperes or less of direct current.

8. The power system of claim 7, further comprising a plurality of power bays with each power bay containing up to eight rectifiers with each rectifier being rated for up to 450 amperes of direct current, wherein said power bays being electrically connected in parallel and adjacent power bays being interconnected at said power bay charge buses.

9. The power system of claim 8, wherein said plurality of power bays is at least three or greater number of power bays.

10. The power system of claim 1, wherein said frame of said power bay includes opposed top and bottom members, wherein said top and bottom members are within about seven feet or less of one and the other.

11. The power system of claim 2 further comprising a shunt for monitoring the amount of direct current entering said power distribution assembly, said shunt being electrically connected between said power distribution charge bus and said fuses or said circuit breakers and further being located within said frame of said power distribution assembly.

12. A central DC office power system comprising:
    a modular power bay comprising a plurality of rectifiers each being rated at up to 450 amperes of direct current for converting the alternating current to direct current, the direct current being at least about 15,000 amperes or less, a power bay charge bus in electrical communication with said rectifiers for receiving the direct current from the rectifiers, said power bay charge bus having opposing ends; and a frame being no more than about seven feet in height for containing said rectifiers and said power bay charge bus; wherein said power bay charge bus is disposed within said frame;
    a modular power distribution assembly comprising a plurality of electrical fuses or circuit breakers each being rated at about 200 to about 600 amperes of direct current for routing direct current therethrough; a power distribution charge bus having opposed ends wherein one end of said power bay charge bus is in electrical communication with one end of said power distribution charge bus, said power distribution charge bus being in electrical communication with said fuses or said circuit breakers via a shunt interference; a frame being no more than about seven feet in height for containing said fuses or said circuit breakers and said power distribution charge bus; wherein said power distribution charge bus is disposed within said frame; wherein when said modular power distribution assembly and said power bay are adjacent to one and the other, one end of said power bay charge bus being interconnected with one end of said power distribution charge bus to provide electrical connection therethrough;
    a battery reserve in electrical communication with said power bay charge bus for delivering supplemental DC current;
    a battery distribution fuse bay in electrical communication with said power distribution assembly for delivering a plurality of DC currents to DC power-consuming equipment.

13. The central DC office power system of claim 12, wherein the direct current is 2,400 amperes or greater.

14. The central DC office power system of claim 13, wherein the direct current is 6,000 amperes or greater.

15. A power distribution assembly capable of receiving and delivering about 15,000 amperes or less of direct current comprising:
- a frame having a base member, an opposed top member and plurality of vertical posts disposed therebetween to define a generally rectangular structure, two of said vertical posts defining a front surface of said power distribution assembly;
- devices for monitoring the direct current, said devices being disposed on said front portion;
- a plurality of fuses or circuit breakers contained within said frame; said fuses or said circuit breakers being in electrical communication with a charge bus for receiving the direct current and having fuse or circuit breaker outlets that are angled towards the first surface for delivering the direct current;
- a plurality of cables having fuse or circuit breaker-connecting ends;
- a tray for supporting portions of said electrical cables at said fuse or circuit breaker-connecting ends, said tray being angled towards said first surface;
- wherein said angled fuse or circuit breaker outlets and said fuse or circuit breaker-connecting ends are terminated at an opening of said front surface.

16. The power distribution assembly of claim 15, wherein the direct current is at least 2,400 amperes or greater.

17. The power distribution assembly of claim 15 further including a door for releasably covering said opening.

18. The power distribution assembly of claim 15, wherein said fuse outlets are at an acute angle about 30 degrees to 60 degrees to said front surface.

19. The power distribution assembly of claim 15 further comprising a shunt electrically connected between the charge bus and the fuses.

20. The power distribution assembly of claim 19 further comprising a ground return bus, wherein said shunt, said charge bus and said ground return bus are disposed within said frame.

21. The power distribution assembly of claim 20, wherein said top and bottom members of said frame are no more than about seven feet apart from one and the other.

22. The power distribution assembly of claim 15, wherein said fuse-connecting ends of said cables are securably attached to said fuse outlets to form a fuse-to-cable connection thereat.

23. The power distribution assembly of claim 22, further including a temperature probe to monitor temperature proximal to said fuse-to-cable connection.

24. The power distribution assembly of claim 15, wherein said opening of said front surface has a size for accessing said angled fuse or circuit breaker outlets, said fuse or said circuit breaker connector ends, and said fuses or said circuit breakers.

* * * * *